United States Patent [19]
Plegat

[11] 3,808,861
[45] May 7, 1974

[54] APPARATUS FOR CONTINUOUSLY FORMING A TUBE AND CONTINUALLY CUTTING THE TUBE INTO SUBSTANTIALLY UNIFORM LENGTHS

[75] Inventor: Alain Edouard Plegat, Asnieres, France

[73] Assignee: Societe Anonyme Des Usines Chausson, Asnieres, France

[22] Filed: July 5, 1972

[21] Appl. No.: 269,243

[30] Foreign Application Priority Data
July 7, 1971 France.............................. 71.24825

[52] U.S. Cl....................... 72/132, 29/33 D, 83/315
[51] Int. Cl............................................. B21j 11/00
[58] Field of Search ............. 72/250, 177, 131, 129, 72/176, 205, 132

[56] References Cited
UNITED STATES PATENTS
1,940,939  12/1933  Corgell ................................ 72/205
1,468,635  9/1923  Higgins ............................. 72/131 X
3,523,513  8/1970  Maier.............................. 29/33 D X Primary Examiner—Milton S. Mehr
Attorney, Agent, or Firm—Imirie and Smiley

[57] ABSTRACT

Apparatus for continuously forming a tube and continually cutting a tube into substantially uniform lengths comprises first and second strip drive mechanism with strip tensioning means therebetween for supplying an elongated strip at substantially constant speed to shaping wheels for forming the strip continuously into a tube and driven at the same constant speed, in combination with reciprocal cutting means driven at the same constant speed of said shaping means and means actuating the cutting means to effect cutting the tube into selected lengths.

7 Claims, 3 Drawing Figures

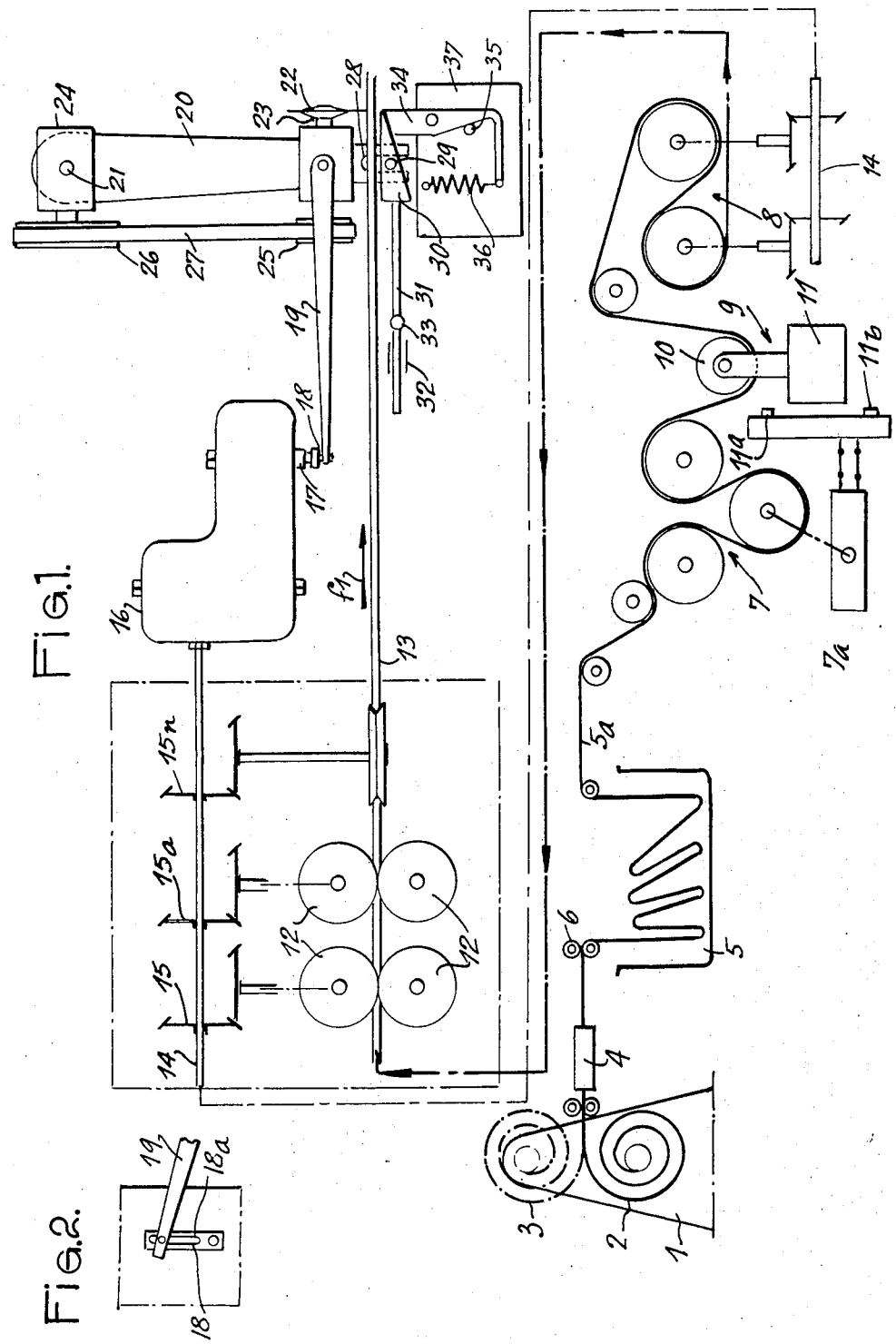

APPARATUS FOR CONTINUOUSLY FORMING A TUBE AND CONTINUALLY CUTTING THE TUBE INTO SUBSTANTIALLY UNIFORM LENGTHS

BACKGROUND OF THE INVENTION

In some industries, especially in the production of heat exchangers, the cutting of a continuously manufactured tube is an important problem when the tube to be cut advances at high speed and when the sections to be obtained must have a very accurate length. The forming of tubes, very often, is performed by sets of forming wheels working a continuously fed strip material supplied by drive mechanism from a stock of strip fed by successive rolls of strips, the ends thereof being joined up upon consumption of each roll. On the other hand, up to now the best way to cut the tube at the outlet of the forming mechanism consists of sawing the same by moving a continuously driven saw at a speed as close as possible to the advance speed of the tube. For that purpose, it is of a current use to place the saw on an oscillating arm and to cause the driving of said oscillating arm in a pendular motion from measuring wheels or rollers engaging the tube as it is fed from the forming mechanism.

It has been noted that the tube sections often have differences in length greater than the admissible tolerances, and this seems being due to several factors. First, there may be slippage between the tube and the measuring wheel or roller driving the sawing group into the pendular motion thereof. In any case since it is necessary to restrict such slippage, a relatively high pressure has to be applied by the measuring wheel to the tube and as a result a milling appears on the portion of the tube where said pressure is applied. In some manufacturing, such milling is undesirable.

On the other hand, it has also been noted that due to inertia, the sawing group becomes distorted, which increases the lack of accuracy already due to the frequent slippage of the wheel or other measuring device.

Still further, it has been noted that the advance speed, of the tube forming strip material to the forming mechanism, and consequently also the tube formed by said forming mechanism, is not as constant as desired because of variable strains applied on the strip as it is fed to the forming mechanism and such strains cause slippage of the strip on the drive mechanism feeding strip to the forming mechanism.

SUMMARY OF THE INVENTION

According to the invention, the device for continuously forming and continually cutting a tube in selected lengths, comprises a mechanism for feeding a strip at a continuous speed to a tube forming mechanism, said feeding mechanism comprising two drive mechanisms separated from each other by an element exerting a constant tension on the strip, the forming mechanism comprising sets of shaping wheels driven by a drive shaft common to at least the last of said drive systems and said forming mechanism, the drive thereof being also transmitted to a cutting group having a reciprocating motion, whereby both the advance speed of the strip fed to the forming mechanism is regulated and the cutting group is controlled by the mechanism forming the tube.

BRIEF DESCRIPTION OF THE DRAWINGS

FIG. 1 is a diagrammatic view of the device of the invention;

FIG. 2 is an enlarged fragmentary elevation view of a detail of FIG. 1, and

DETAILED DESCRIPTION OF THE INVENTION

Figure 3:
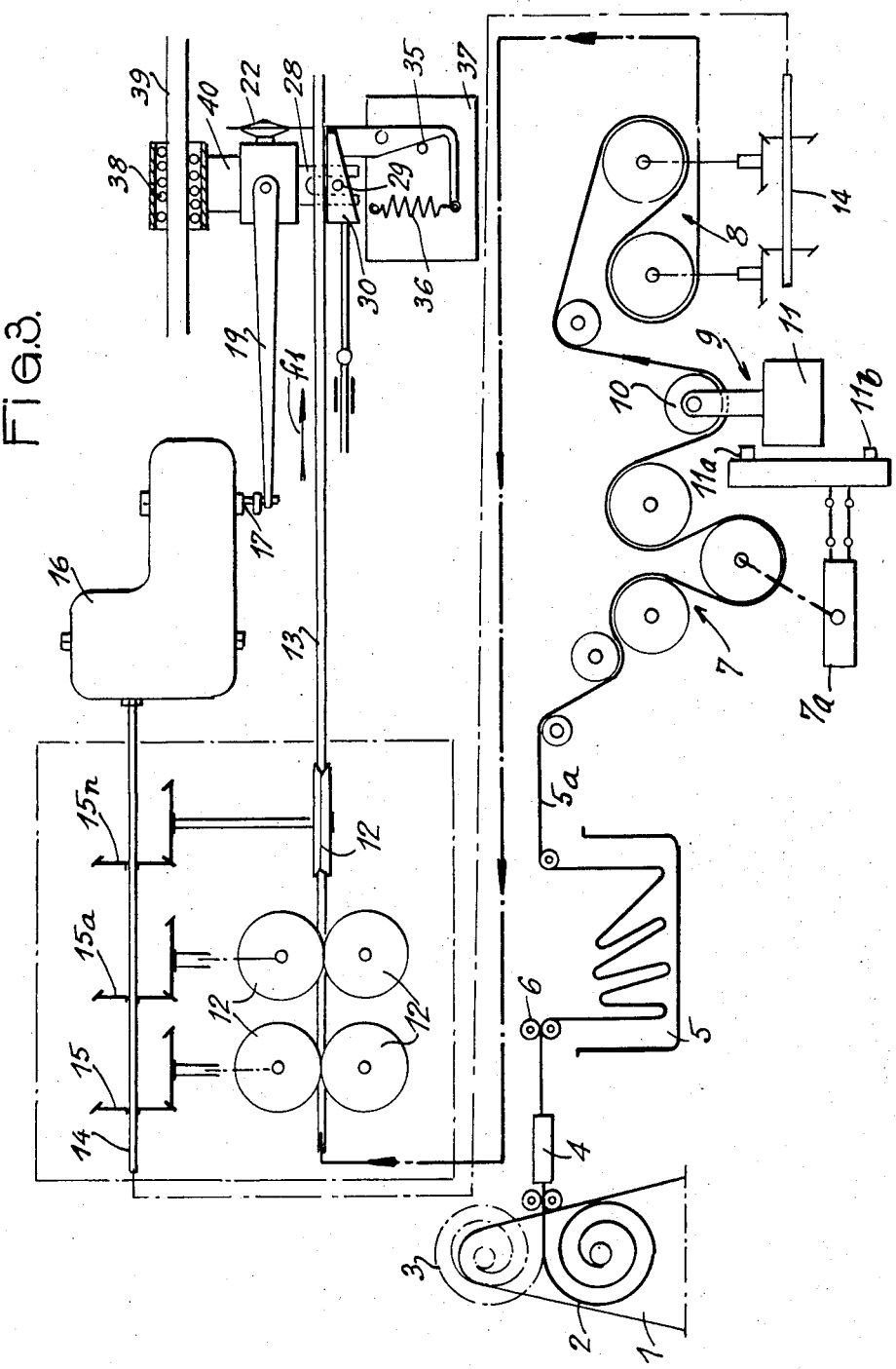
FIG. 3 is a partial diagrammatic view, similar to FIG. 1, of a modification.

The device according to the invention which is designed to cut into sections of equal length a continuously manufactured tube comprises, in the embodiment according to FIG. 1, a support 1 for rolls of strips 2 and 3 from which a continuous strip is alternatively unrolled. In the illustrated example, the strip 2 is unrolled but when said strip has been entirely utilized, then the strip 3 is brought into a joining device 4 which connects it to the end of the strip 2. The joining device 4, which is a well known device, operates when the strips to be joined are stopped and for this reason a stock 5 of strip 5a is prepared downstream of the device 4.

Due to the presence of the stock 5, the strip, upon feeding from said stock, for example the strip 5a, can be continuously advanced since the quantity of strip material contained in the stock 5 is sufficient to allow the joining device 4 to operate without the strip contained into said stock 5 to be entirely utilized. Also in a well known way the strip is brought into the stock 5 by cylinders 6 driven either at a variable speed or at a constant speed, slightly higher than the speed at which the strip is fed from the stock 5.

To remove the strip from the stock 5 the device of the invention provides two strip drive mechanisms 7 and 8 separated from each other by a tensioning mechanism 9 for example constituted by a roller 10 from which is suspended an inertia block 11. Besides, the drive mechanism 8 is placed as close as possible to the set of forming wheels 12 which form a tube 13 from the strip brought thereto.

The working speed of the forming wheels 12 is substantially equal to the speed of the drive mechanism 8, the latter preferably being driven from a shaft 14 also utilized for driving gear trains 15, 15a......15n to the sets of forming wheels 12.

The shaft 14 is also utilized for the driving of a transmission mechanism 16 which preferably is constituted by a gear box of which the output shaft 17 drives through a crank 18 (FIG. 2) a connecting rod 19, the head thereof being connected to an oscillating arm 20 supported by a pivot joint 21.

The oscillating arm 20 supports, near the end thereof, a saw 22 continuously driven in rotation through a shaft 23, said shaft being connected to a motor 24 for example by return-pulleys 25, 26 and a belt 27. The motor 24, if constituted by a conventional electric motor, is preferably placed on the arm 20 close to the pivot joint 21 thereof, but if the motor is of a very light special type, for example a motor of the high frequency type, then it can be supported by the end of the arm 20 to directly drive the saw 22, which eliminates the above described transmission and reduces the mass supported by the arm 20.

The arm 20 terminates in a fork-joint 28 in which is engaged a finger 29 of a wedge 30 carried by a rod 31 slidable into a guide 32. The rod 31 can be flexible or provided with a hinge 33.

A rotating catch 34 is normally maintained bearing against a stop 35 by means of a spring 36, both said spring and the catch being supported by a fixed support 37.

The drive mechanism 7, in contrast to the drive mechanism 8, is driven through a motor-reducer 7a at variable speed, the changes in speed being controlled from two proximity detectors 11a and 11b detecting the position of the inertia block 11. If the inertia block comes near the detector 11b the speed of the drive mechanism 7 is decreased and, on the contrary, if the inertia block comes near the detector 11a said speed is increased.

As it appears from the above description, the tube 13 formed by the sets of wheels 12 advances continuously in the direction of arrow $f_1$. The speed of which the tube advances is very steady due to the group of the two drive mechanisms 7 and 8 separated by the tensioning mechanism 9. In fact, the changes in strength that can be shown by the strip in 5a when coming from the stock 5 can, in some cases, cause some slippage of said strip on the drive mechanism 7, but the tension strain at the inlet of the drive mechanism 8 being kept strictly constant due to the presence of the tensioning mechanism 9 and also due to the variable speed of the drive mechanism 7, the motion of the strip at the outlet of said drive mechanism 8 is perfectly steady and exactly corresponds to the speed of the set of wheels 12 forming the tube. The wheels 12 being, on the other hand, driven by the same shaft 14 as the one driving the oscillating arm 20, the motion of said arm is thus perfectly synchronized with the motion of said sets of wheels without any possibility of slippage with respect to the tube 13 since the whole assembly supplying the forming strip and controlling the cutting is connected to the same main driving shaft and since the strip the tube is formed from, always has a constant strength during the forming of the tube.

The operation of the cutting mechanism is well known per se. In fact, when the connecting rod 19 is driven by the crank 18, the arm 30 is moved according to a pendular motion and, during the motion thereof in the direction of the arrow $f_1$, the same drives the wedge 30 which is then pushed by the catch 34 to slightly bent the tube 13 which is thus brought into contact with the saw 22, thus providing the cutting of a first section of tube. During the return stroke of the pendular arm 20, the rear portion of the wedge 30, which has escaped from the catch 34, hits said catch which rotates around its pivot joint against the action of spring 36 witnout causing a new bend in tube 13. Then the cycle is repeated.

The transmission mechanism 16, when in the form of a gear-box as mentioned in the above disclosure, provides when passing from a ratio to another one to adjust the output speed of the shaft 17 and consequently the frequency of operation of the oscillating arm 20, which results in a correlative adjustment of the length of the tube sections. A subsequent adjustment can still be obtained by designing in the crank 18 a slot 18a for adjusting the application point of the foot of the connecting rod 19.

FIG. 3 illustrates a slight variant wherein the pendular arm is replaced by an antifriction slide member 38 mounted on a guide 39 parallel with the tube 13. The slide member 38 supports an arm 40 for the saw 22 and the motor or the supporting bearing thereof, said arm also forming the fork-joint 28 providing the driving of finger 29 of the wedge 30. The connecting rod 19 is, in that case, connected by its head to the arm 40 which is thus moved in a reciprocating and linear motion, thus eliminating all gyroscopic effect which could be produced by the saw 22 running at high speed in the case of a pendular motion as that of the embodiment according to FIG. 1.

The invention is not restricted to the embodiments shown and described in detail, for various modifications thereof can moreover be applied to it without departing from the scope of the invention.

I claim:

1. Apparatus for continuously forming a tube and continually cutting the tube in substantially uniform lengths, comprising:

means for supplying an elongate strip at substantially constant speed and comprising first and second strip drive mechanisms with strip tensioning means therebetween;

means including sets of shaping wheels driven at constant uniform speed by a common shaft for receiving and forming said strip continuously into a tube, the constant speed of said wheels being substantially identical to the speed of strip supplied to said shaping wheels;

cutting means disposed to reciprocate along the path of the tube as it is fed from said forming means;

means driven by said common shaft for reciprocating said cutting means, and means actuated by movement of said cutting means to effect operation of said cutting means to cut the tube.

2. Apparatus according to claim 1 wherein said first strip drive mechanism precedes said second drive mechanism which preceeds said shaping means and is driven by said common shaft.

3. Apparatus according to claim 2, comprising a variable speed motor in driving relation with said first drive mechanism, and means responsive to variations in said strip tensioning means for controlling the speed of said motor.

4. Apparatus according to claim 3 wherein said tensioning means comprises a roller freely supported on said strip and having weight means suspended therefrom for vertical movement according to the length of strip between said first and second drive mechanisms, said variable speed motor control means comprising vertically spaced detector means disposed adjacent the path of said weight means and responsive to the proximity of said weight means for varying the speed of said motor.

5. Apparatus according to claim 1 wherein said reciprocating means comprises a variable ratio non-slip transmission driven by said common shaft.

6. Apparatus according to claim 1 wherein said cutting means comprises a carrier arm pivotally suspended on an axis perpendicular to said tube path and connected with said reciprocating means to be oscillated thereby in a direction parallel with said tube path, and cutting mechanism supported by said carrier arm adjacent said tube path, said means to effect operation of said cutting means comprising cam means reciprocated by said carrier arm in a path parallel with said tube path and operative in its stroke in the direction of tube movement to bias the tube into engagement with said cutting mechanism.

7. Apparatus according to claim 1 wherein said cutting means comprises a carrier member slidably supported for movement parallel with said tube path and connected with said reciprocating means to be reciprocated thereby in a direction parallel with said tube path, and cutting mechanism supported by said carrier member adjacent said tube path, said means to effect operation of said cutting means comprising cam means reciprocated by said carrier member in a path parallel with said tube path and operative in its stroke in the direction of tube movement to bias the tube into engagement with said cutting mechanism.

* * * * *